US012033783B2

(12) United States Patent
Park

(10) Patent No.: US 12,033,783 B2
(45) Date of Patent: Jul. 9, 2024

(54) POWER SAVING DEVICE

(71) Applicant: GLOBAL HISES CO.,LTD, Anyang-si (KR)

(72) Inventor: Hee Joon Park, Seoul (KR)

(73) Assignee: GLOBAL HISES CO.,LTD, Anyang-si (KR)

( * ) Notice: Subject to any disclaimer, the term of this patent is extended or adjusted under 35 U.S.C. 154(b) by 0 days.

(21) Appl. No.: 18/450,441

(22) Filed: Aug. 16, 2023

(65) Prior Publication Data

US 2023/0386729 A1 Nov. 30, 2023

Related U.S. Application Data

(63) Continuation of application No. PCT/KR2022/002203, filed on Feb. 15, 2022.

(30) Foreign Application Priority Data

Feb. 18, 2021 (KR) ........................ 10-2021-0021532

(51) Int. Cl.

*H01F 27/26* (2006.01)
*H01F 17/06* (2006.01)
*H01F 30/16* (2006.01)

(52) U.S. Cl.

CPC ......... *H01F 27/266* (2013.01); *H01F 17/062* (2013.01); *H01F 30/16* (2013.01)

(58) Field of Classification Search

CPC ...... H01F 27/266; H01F 27/06; H01F 17/062; H01F 27/28; H01F 30/16; H01F 27/04; H01F 27/29; H01F 29/02; H01F 29/025; H01F 29/04; H05F 1/147

See application file for complete search history.

(56) References Cited

U.S. PATENT DOCUMENTS 1,815,707 A * 7/1931 Gerth ...................... H01F 30/16 336/60
3,299,384 A * 1/1967 Lee ....................... H01F 27/363 336/171

(Continued)

FOREIGN PATENT DOCUMENTS

GB 2043971 A 10/1980
JP 3108167 U 4/2005

(Continued)

*Primary Examiner* — Mang Tin Bik Lian
(74) *Attorney, Agent, or Firm* — NKL Law; Byungwoong Park

(57) ABSTRACT

The disclosed is the power saving device capable of reducing power consumption by maintaining a constant output voltage even when an input voltage changes, and more particularly, the power saving device capable of improving the performance and lifespan of a load by stably adjusting a supplied voltage through the toroidal core, the multi-channel switch, and the control means for controlling the same and then supplying it to the load side and also reducing power consumption accordingly, and particularly, safely and firmly fixing the toroidal core in which the primary coil and the secondary coil are wound inside the power saving device by using the core fixing members and also preventing a temperature rise by easily discharging the heat generated in the toroidal core out of the device.

4 Claims, 5 Drawing Sheets

(56) References Cited

U.S. PATENT DOCUMENTS

| | | | | | |
|---|---|---|---|---|---|
| 3,418,612 | A * | 12/1968 | Beckwith | H01F 7/145 | 335/229 |
| 3,675,176 | A * | 7/1972 | Brown | H01F 27/346 | 336/182 |
| 5,670,924 | A * | 9/1997 | Heinrich | H01F 27/06 | 336/61 |
| 7,710,228 | B2 * | 5/2010 | Feng | H01F 41/122 | 336/131 |
| 2016/0315454 | A1 * | 10/2016 | Martinez-Cruz | H02B 1/36 | |
| 2017/0092405 | A1 * | 3/2017 | Manahan | H05K 5/0212 | |
| 2018/0363639 | A1 * | 12/2018 | Cathell | F04B 49/06 | |

FOREIGN PATENT DOCUMENTS

| | | | |
|---|---|---|---|
| JP | 2005-198146 | A | 7/2005 |
| KR | 10-2014-0051277 | A | 4/2014 |
| KR | 10-2015-0025859 | A | 3/2015 |
| KR | 10-2274782 | B1 | 7/2021 |

* cited by examiner

POWER SAVING DEVICE

TECHNICAL FIELD

The present invention relates to a power saving device capable of saving power by maintaining a constant output voltage even when an input voltage changes, and more particularly, to a power saving device capable of saving power by adjusting a supplied voltage to a stable voltage through the mutual induction of a toroidal core and then supplying the adjusted voltage to a load side.

BACKGROUND

In general, a power saving device is a device that reduces the amount of electrical energy used while an electrical device performs the same task. There are three types of methods of reducing the amount of electricity used while performing the same amount of work. This is enabled by improving one of the elements constituting power.

In other words, P (power)=V (voltage)*I (current)*COS θ (power factor), so that it is common to adopt a method of reducing the voltage or current or increasing the power factor, among these three elements.

A power saving device that reduces the power of an overall distribution line by increasing the power factor among these elements has recently been disclosed. In general, the power factor represents the ratio between active power and apparent power in an AC circuit.

Commonly, in a DC circuit, the product of voltage and current is power, whereas in an AC circuit, the product of the effective values of current and voltage is not necessarily power. In an AC circuit, the product of voltage and current is called apparent power, and power is obtained only when the apparent power is multiplied by the power factor. The reason for this is that the voltage or current of an AC circuit fluctuates in a sinusoidal (sine wave) shape, and the phases of both sinusoidal waves thereof do not necessarily match each other in some cases.

Conventional AC power control and conversion devices include linear voltage conversion devices such as single-turn and double-turn transformers or reactors, and power control devices using phase control via a switching semiconductor device or PWM control. The general transformer-type power control devices have a problem in that they are excessively bulky and heavy, and thus have low practicality. The switching control-type power control devices using an electronic circuit have emerging problems in that they have poor durability, reliability, and economy and generate EMI that impairs a surrounding electrical environment.

Among the conventional linear control-type devices, British patent GB2043971A entitled "Constant Voltage Control Device" is based on a primary coil polarity conversion switching method. This device cannot perform delicate constant voltage control. Furthermore, unless primary coil power is cut off and a primary side is excited, all the secondary coils connected in series to a load side are changed into circuit resistance, which may cause overheating due to heat loss.

In addition, when a primary coil circuit switch is closed and a closed circuit is formed such that load current flows through the secondary coil, the current induced in the primary coil generates heat due to its own loss, and thus power loss increases. Moreover, with this control method, a counter electromotive voltage occurs at the moment of switching and a transient phenomenon occurs, which provides considerable electromagnetic noise to the load side when the load is an electronic product (a computer, an audio device, a TV, or the like). There are restrictions on use for electronic products, which are load conditions other than electric circuit loads such as motors and heaters. During bypass, a sudden power change may cause a power failure, which has a significant influence on the load.

SUMMARY

The present invention is intended to overcome the problem of the conventional transformer-type power control devices in which the conventional transformer-type power control devices are excessively bulky and heavy and thus have low practicality and the problems of the conventional switching control-type power control devices using an electronic circuit in which the conventional switching control-type power control devices have poor durability, reliability, and economic feasibility and generate EMI that impairs a surrounding electrical environment, and an object of the present invention is to provide a power saving device capable of saving power by stably regulating a supplied voltage through a toroidal core, a multi-channel switch, and a control means for controlling the same and then supplying the supplied voltage to a load side.

Another object of the present invention is to provide a power saving device capable of safely and firmly fixing a toroidal core in which a primary coil and a secondary coil are wound inside the power saving device by using core fixing members and also preventing a temperature rise by easily discharging the heat generated in the toroidal core out of the device.

In order to accomplish the above objects, the present invention provides a power saving device including:

- a case having a predetermined volume configured such that a space is formed therein and a main circuit breaker to which external supply power is applied is provided on one side thereof;
- a toroidal core provided inside the case, and configured such that a primary coil connected to the main circuit breaker is wound, a secondary coil configured to form a voltage having a magnitude corresponding to that of a set reference voltage by selectively stepping up and down a voltage induced in the primary coil via a plurality of taps is wound, and the primary coil and the secondary coil are wound in opposite directions;
- core fixing members including a fixing element formed on the bottom surface of the case and provided with a fastening screw protruding upward and a fastening plate formed to have a larger radius than the inner diameter of the toroidal core and configured to be fastened with the fastening screw, and configured such that as the toroidal core is seated on the bottom surface of the case, the fixing element is inserted into the inner diameter of the toroidal core, and the fastening plate is engaged with the fastening screw, presses the top portion of the toroidal core, and fixes the toroidal core into the inside of the case;
- a multi-channel switch provided with a plurality of channels correspondingly connected to the taps of the secondary coil, configured such that in response to a control signal, one channel selected from among the plurality of channels is connected to a bus bar and outputs an adjusted voltage to a load side, and also provided with a mode change switch configured to selectively adopt any one of a bypass mode and a voltage regulation mode; and a control means configured to compare a voltage value, input to the main circuit breaker, with an average input voltage value, to calculate a transformation voltage value based on the comparison between the voltage values, to provide a control signal for adjusting an input voltage to a voltage corresponding to the calculated value to the multi-channel switch, and to output power information related to the input/output voltage to the outside.

Furthermore, the core fixing members include a seating part configured to protrude from the bottom surface of the case to a predetermined height outside the fixing element and to allow the toroidal core to be spaced apart from the bottom surface of the case.

Furthermore, the seating part includes:

at least one first seating portion formed in a ring shape outside the fixing element;

second seating portions formed radially from the fixing element, and extending to a predetermined length in a direction crossing the first seating portion; and through holes formed in the bottom surface of the case inside or outside the first seating portion or between the second seating portions.

The present invention has the effect of improving the performance and lifespan of a load by stably adjusting a supplied voltage through the toroidal core, the multi-channel switch, and the control means for controlling the same and then supplying it to a load side, and also has the remarkable effect of reducing power consumption accordingly.

The present invention is also directed to the provision of the power saving device capable of safely and firmly fixing the toroidal core in which the primary coil and the secondary coil are wound inside the power saving device by using the core fixing members and also preventing a temperature rise by easily discharging the heat generated in the toroidal core out of the device.

DETAILED DESCRIPTION OF EXEMPLARY EMBODIMENTS

Figure 1:
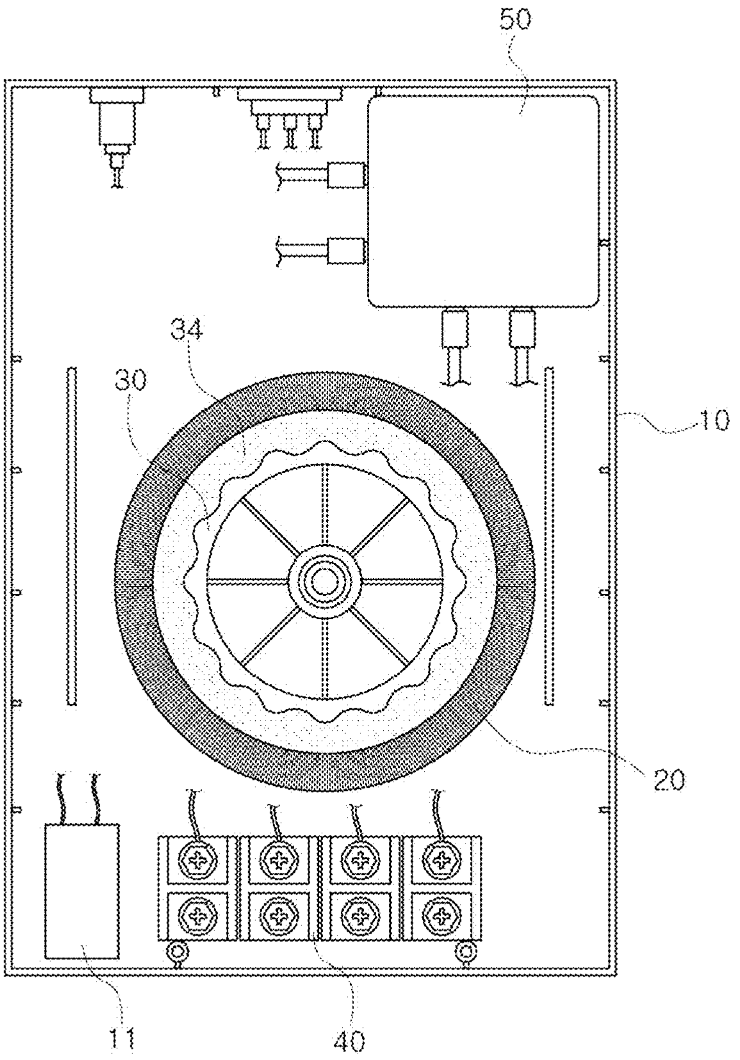
FIG. 1 is a plan view showing the inside of a power saving device according to the present invention, respectively.

The embodiments to be described below are intended to describe the present invention in detail so that those of ordinary skill in the art to which the present invention pertains can easily practice the present invention. However, this is not meant to limit the technical spirit and scope of the present invention.

Furthermore, it is noted that the sizes or shapes of the components shown in the drawings may be exaggerated for the clarity and convenience of description, the terms specifically defined by taking into consideration the configuration and operation of the present invention may vary according to the intention or custom of a user or administrator, and the definitions of these terms should be made based on the context throughout the present specification.

Preferred embodiments of a power saving device according to the present invention will be described below with reference to the accompanying drawings.

A power saving device according to the present invention includes: a case 10 having a predetermined volume configured such that a space is formed therein and a main circuit breaker 11 to which external supply power is applied is provided on one side thereof; a toroidal core 20 provided inside the case 10, and configured such that a primary coil 22 connected to the main circuit breaker 11 is wound, a secondary coil 24 configured to form a voltage having a magnitude corresponding to that of a set reference voltage by selectively stepping up and down a voltage induced in the primary coil 22 via a plurality of taps is wound, and the primary coil 22 and the secondary coil 24 are wound in opposite directions; core fixing members 30 including a fixing element 31 formed on the bottom surface of the case 10 and provided with a fastening screw 31 a protruding upward and a fastening plate 32 formed to have a larger radius than the inner diameter of the toroidal core 20 and configured to be fastened with the fastening screw 31 a, and configured such that as the toroidal core 20 is seated on the bottom surface of the case 10, the fixing element 31 is inserted into the inner diameter of the toroidal core 20, and the fastening plate 32 is engaged with the fastening screw 31 a, presses the top portion of the toroidal core 20, and fixes the toroidal core 20 into the inside of the case 10; a multi-channel switch 40 provided with a plurality of channels correspondingly connected to the taps of the secondary coil 24, configured such that in response to a control signal, one channel selected from among the plurality of channels is connected to a bus bar and outputs an adjusted voltage to a load side, and also provided with a mode change switch configured to selectively adopt any one of a bypass mode and a voltage regulation mode; and a control means 50 configured to compare a voltage value, input to the main circuit breaker 11, with an average input voltage value, to calculate a transformation voltage value based on the comparison between the voltage values, to provide a control signal for adjusting an input voltage to a voltage corresponding to the calculated value to the multi-channel switch 40, and to output power information related to the input/output voltage to the outside.

Furthermore, the core fixing members 30 include a seating part 33 formed on the bottom surface of the case 10 circumferential outside the fixing element 31 and configured to protrude to a predetermined height and to allow the toroidal core 20 to be seated in the state of being spaced apart from the bottom surface of the case 10.

Furthermore, the seating part 33 includes: at least one first seating portion 33*a* formed in a ring shape outside the fixing element 31; second seating portions 33*b* formed radially from the fixing element 31, and extending from the fixing element 31 to a predetermined length in a direction crossing the first seating portion 33*a*; and through holes 33*c* formed in the bottom surface of the case 10 inside or outside the first seating portion 33*a* or between the second seating portions 33*b*.

Figure 2:
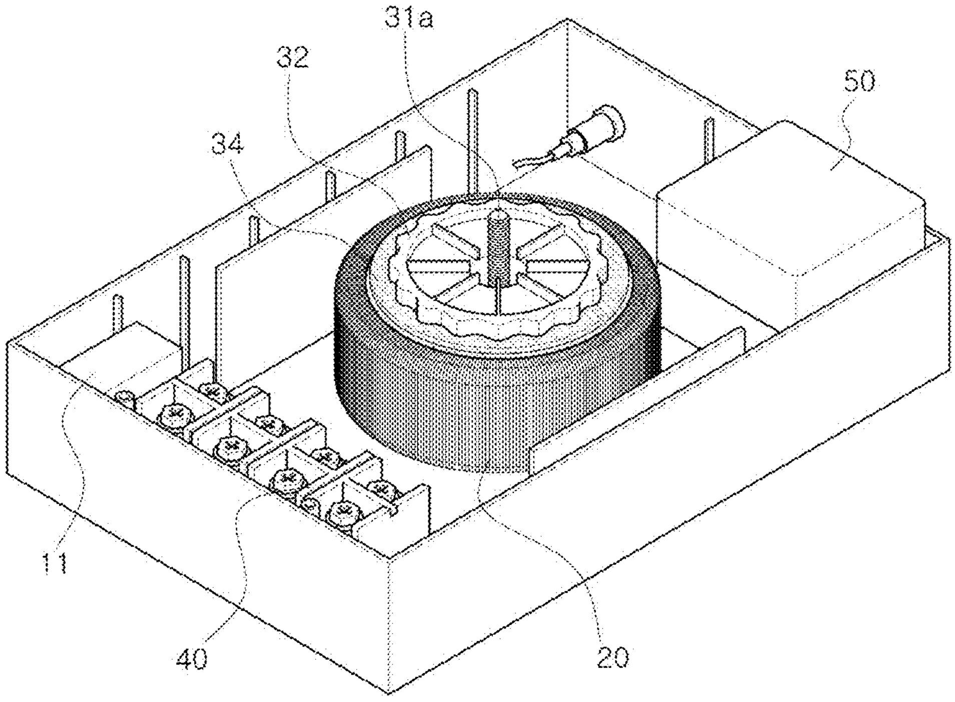
FIG. 2 is a perspective view showing the inside of a power saving device according to the present invention, respectively.
Figure 3:
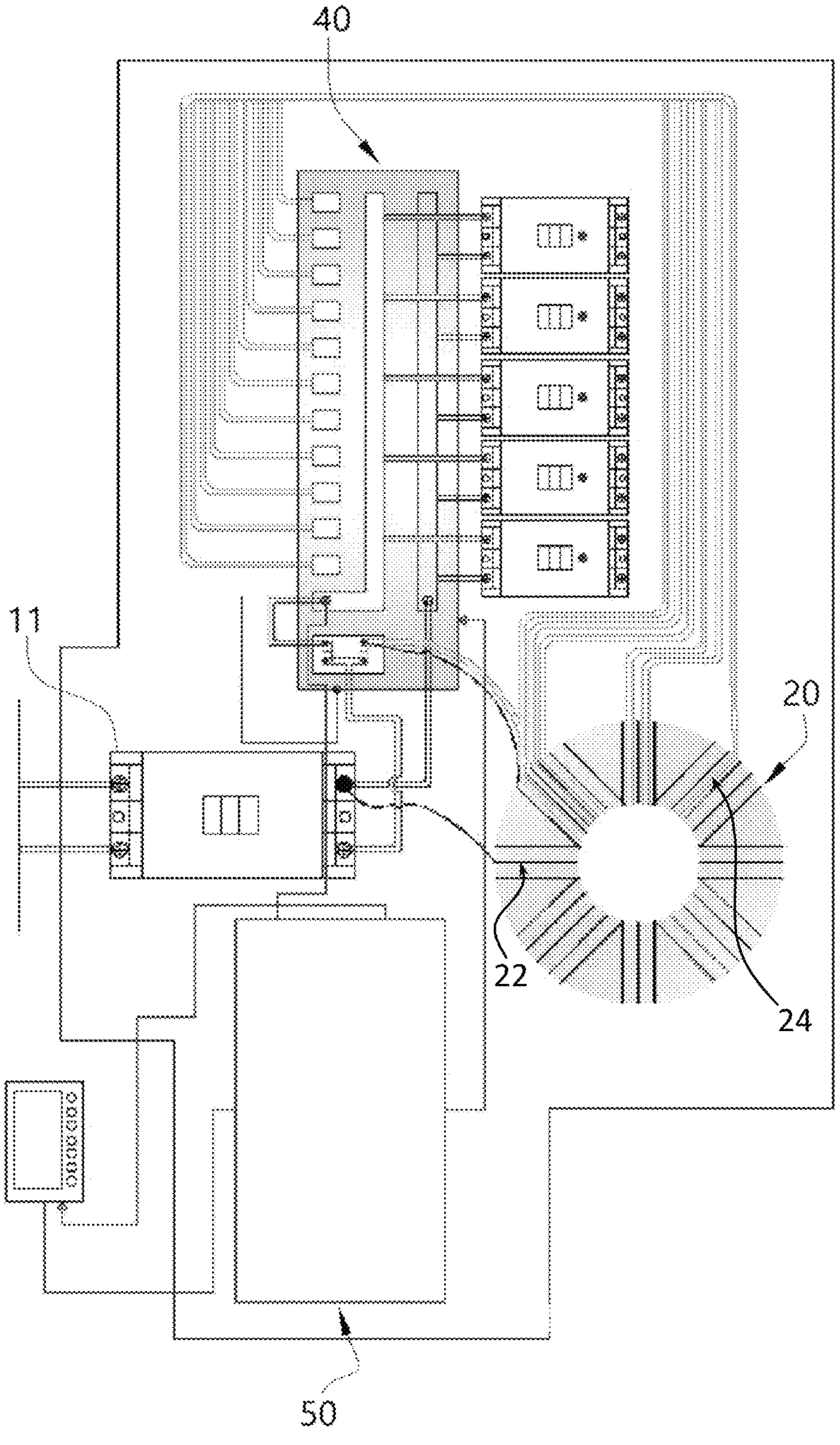
FIG. 3 is a diagram showing the schematic configuration of the power saving device according to the present invention.

As shown in FIGS. 1 to 3, the power saving device according to the present invention stably regulates the AC voltage supplied from Korea Electric Power Corporation (KEPCO) so that rated power is output to a load side. The power saving device is formed of the case 10 having a predetermined volume. The main circuit breaker 11 configured such that the power supplied from KEPCO is applied thereto, the toroidal core 20 connected to the main circuit breaker 11, the multi-channel switch 40 connected to the toroidal core 20, and the control means 50 configured to control the same are included in the case 10.

In the toroidal core 20, the primary coil 22 is connected to the main circuit breaker 11, the secondary coil 24 having a plurality of taps is wound in the direction reverse to that of the primary coil 22, the primary coil 22 is supplied with the external power applied from the main circuit breaker, and the secondary coil 24 corrects the supplied power to a voltage corresponding to the reference voltage by selectively stepping up and down the voltage, induced in the primary coil 22, via the plurality of taps.

In the toroidal core 20, a step-down or step-up value according to a variable input voltage may be freely adjusted and input or automatically adjusted regardless of single-phase or three-phase voltage fluctuations input from the outside through the main circuit breaker 11, and the toroidal core 20 is wound such that the voltage can be adjusted to about 220 V±2% (216 to 224 V) or 380 V±3% (370 to 390 V).

Furthermore, the toroidal core 20 may include a total of seven taps including one reference tap, four step-down taps composed of −3 V, −6 V, −9 V, and −12 V taps, and two step-up taps composed of +3 V and +6 V taps.

It is obvious that the number of taps may be designed to be modified in various ways according to the installation environment and conditions of the device.

Furthermore, the toroidal core 20 is constructed through the medium of one primary coil, one secondary coil unit, and one transfer switch in a single-phase case, or three primary coils, three secondary coils, and three transfer switches in a three-phase case.

Figure 4:
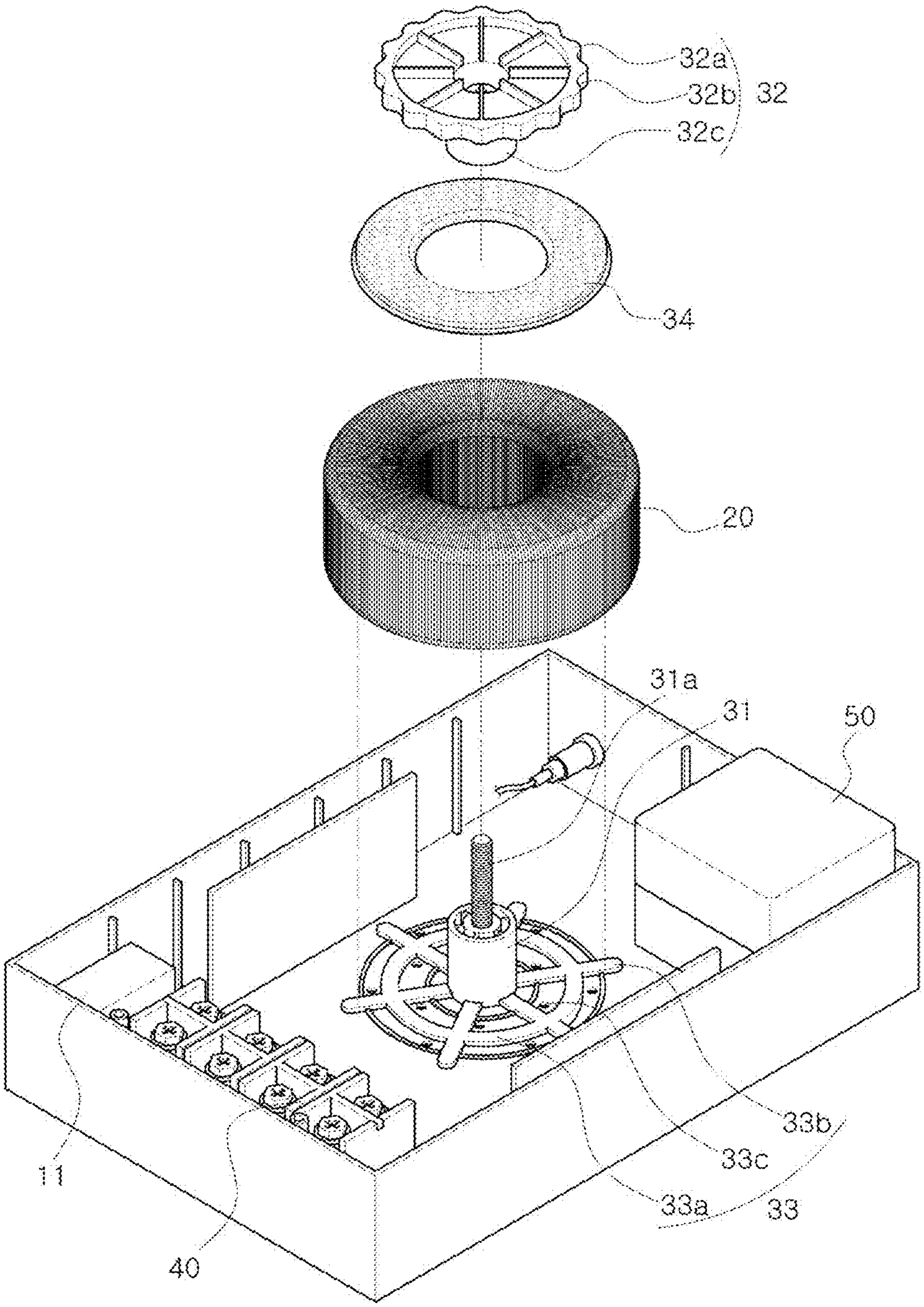
FIG. 4 is a diagram showing a state in which a toroidal core is about to be fixed with core fixing members inside the power saving device according to the present invention.
Figure 5:
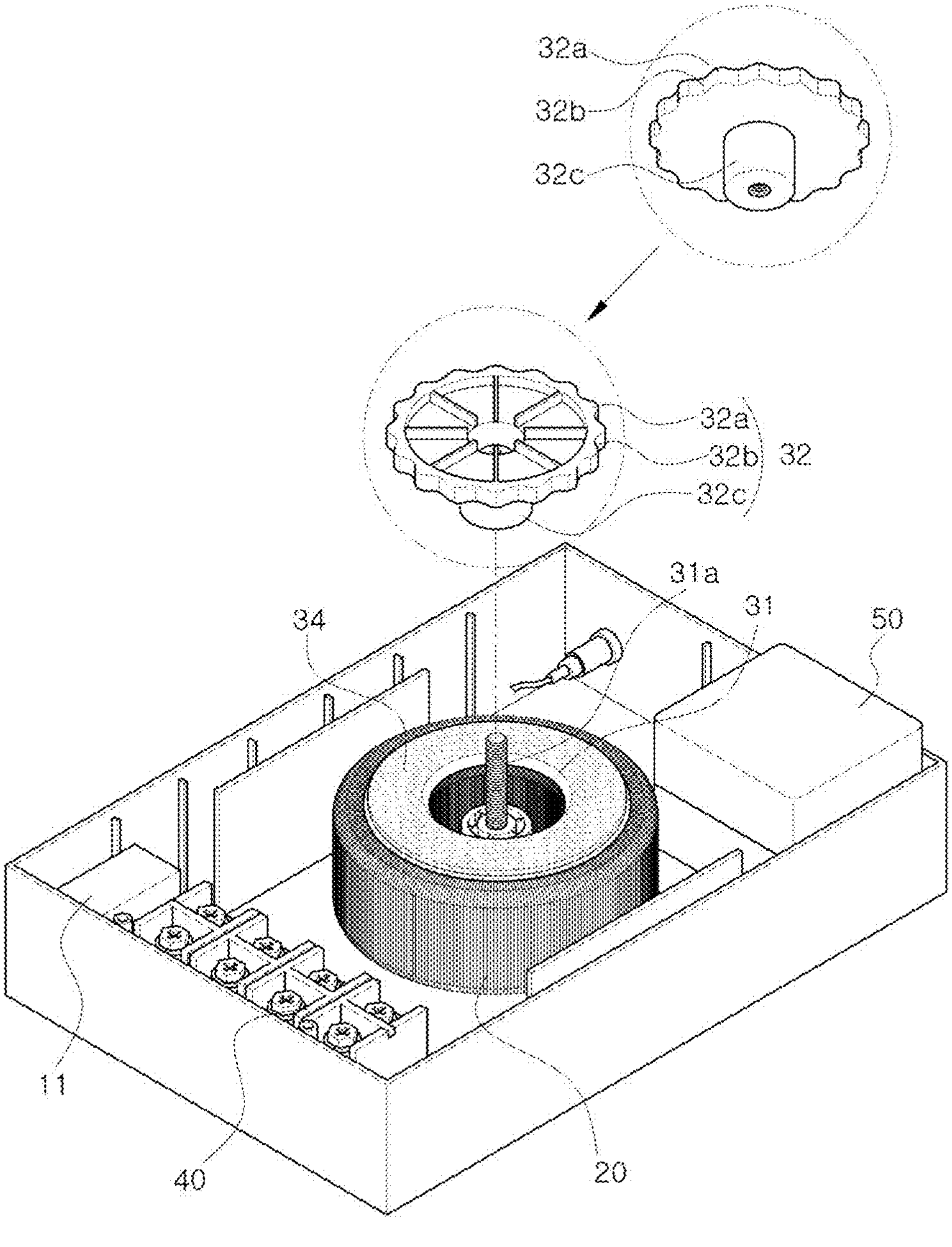
FIG. 5 is a diagram showing a state in which a toroidal core is fixed with core fixing members inside the power saving device according to the present invention.

Meanwhile, as shown in FIGS. 4 and 5, the ring-shaped toroidal core 20 is fixed inside the case 10 by the core fixing members 30.

The core fixing members 30 include the fixing element 31 configured to protrude upward from the bottom surface of the case 10 and provided with the fastening screw 31*a* protruding to a predetermined length; and the fastening plate 32 formed to have a radius larger than the inner diameter of the toroidal core and configured to be tightened over the fastening screw 31*a*. When the toroidal core 20 is seated on the bottom surface of the case 10, the fixing element 31 is inserted into the central portion of the toroidal core and the fastening plate 32 is engaged with the fastening screw 31*a*, moves in the direction of the fixing element 31 and presses the top portion of the toroidal core 20, thereby fixing the toroidal core 20 inside the case 10.

The fixing element 31 is formed in a cylindrical shape having a radius smaller than the inner diameter of the toroidal core 20. In the fixing element 31, a screw fixing part configured such that the fastening screw 31*a* is inserted thereinto and protrudes upward therefrom is formed, a space configured such that air can pass therethrough is formed between the screw fixing part and the side surface of the fixing element 31, and a plurality of vent holes are formed in the top surface.

Furthermore, the fastening plate 32 includes: a support portion 32*a* formed in a disk shape having a larger radius than the inner diameter of the toroidal core 20, adapted such that a plurality of recesses 32*b* are formed spaced apart at regular intervals on the outer periphery thereof, and configured to press the toroidal core 20; and a nut portion 32*c* formed underneath the support portion 32*a*, and configured to be fastened with the fastening screw 31*a* of the fixing element 31.

In other words, when the toroidal core 20 is seated on the bottom surface of the case 10, the fixing element 31 is inserted into the center portion of the inner diameter of the toroidal core 20, and the fastening plate 32 is coupled to the fixing element 31 from a position above the toroidal core 20. In particular, as the nut portion 32*c* of the fastening plate 32 is fastened to the fastening screw 31*a* of the fixing element 31, the support portion 32*a* presses the top portion of the toroidal core 20 so that the toroidal core 20 is stably fixed inside the case 10. As a result, there is an effect in which the primary coil, the secondary coil and the toroidal core 20 do not move easily.

Furthermore, a through hole is formed in the center portion of the top surface of the support portion 32*a* of the fastening plate 32, a plurality of supports radially extend to the edge of the support portion 32*a* around the through hole, and a number of depressions are formed between the support portions 32*a*. In addition, recesses 32*b* each formed in a gentle curve are formed in the side surface or outer periphery of the support portion 32*a*, and gently curved protrusions are formed between the recesses 32*b*. A user's fingers are caught on the protrusions while coming into close contact with the recesses 32*b*, so that there is an effect in which the user can safely hold the fastening plate 32 and rotate it easily.

Furthermore, the fastening plate 32 may be easily rotated by rotating the supports by applying force in one direction.

Furthermore, the nut portion 32*c* fastened to the fastening screw 31*a* is formed beneath the support portion 32*a*.

Furthermore, a ring-shaped insulating member 34 made of a material such as paper, synthetic resin, or wood and provided with an inner diameter that allows the nut portion 32*c* to be inserted into the central portion thereof is provided between the toroidal core 20 and the support portion 32*a* of the fastening plate 32.

Furthermore, the core fixing members 30 include the seating part 33 formed on the bottom surface of the case 10 outside the fixing element 31 and configured to allow the toroidal core 20 to be seated in the state of being spaced apart from the bottom surface of the case 10.

Furthermore, the seating part 33 includes: the at least one first seating portion 33*a* formed in a ring shape outside the fixing element 31; the second seating portions 33*b* formed radially from the fixing element 31, and extending from the fixing element 31 to a predetermined length in a direction crossing the first seating portion 33*a*; and the through holes 33*c* formed in the bottom surface of the case 10 inside or outside the first seating portion 33*a* or between the second seating portions 33*b*.

The first seating portion 33*a* may include a plurality of seating portions spaced apart from each other at regular intervals and different radii outward from the fixing element 31, and have a predetermined width. The through holes 33*c* are formed between the fixing element 31 and the first seating portion 33*a* or between the first seating portions 33*a*.

In addition, the second seating portions 33*b* extend to a predetermined length, preferably a length longer than the radius of the toroidal core 20, outward from the fixing element 31. A stop protrusion configured to support the side surface of the toroidal core 20 seated on the seating part 33 may be formed to a predetermined height at one end of each of the second seating portions 33*b* protruding outward from the first seating portion 33*a*.

Therefore, the present invention has the effect of reducing the temperature rise due to the heat generated by mutual induction between the primary and secondary coils of the toroidal core 20 through the seating par 33 or preventing the temperature rise of the overall device and the effect of safely fixing and supporting the toroidal core 20 inside the case 10.

In other words, the toroidal core 20 is seated on the seating part 33 without contact with the bottom surface of the case 10 and spaced apart from the bottom surface of the case 10 by a predetermined height. Portions of the overall bottom surface of the toroidal core 20 are seated on the first seating portion 33*a* and the second seating portions 33*b*, so that the area of contact with the seating part 33 is minimized, thereby easily lowering the heat of the toroidal core 20. There is an effect in which external air may flow into the case 10 through the through holes 33*c* formed in the seating part 33 or the heat of the toroidal core 20 may be discharged out of the case 10 through the through holes 33*c*.

Meanwhile, as shown in FIGS. 1 and 3, the plurality of taps of the secondary coil of the toroidal core 20 are correspondingly connected to the plurality of channels provided in the multi-channel switch 40, and one channel of the multi-channel switch 40 is selectively connected to a bus bar in response to a control signal of the control means 50 to be described later and outputs an automatically adjusted voltage to a load side.

The multi-channel switch 40 is provided with a mode change switch that selectively adopts any one of a bypass mode and a voltage regulation mode.

The mode change switch is connected such that one side thereof is connected to the bus bar and the other side thereof is connected to the secondary coil of the toroidal core 20. When the bypass mode is selected, the mode change switch sets up a connection with the bus bar and releases a connection with the toroidal core 20. In the voltage regulation mode, the mode change switch releases a connection with the bus bar and sets up a connection with the toroidal core 20 and supplies the stable voltage, regulated by the toroidal core 20, to the load side.

In the bypass mode, when an erroneous operation occurs in the toroidal coil or the multi-channel switch 40, the switch releases a connection with the toroidal core 20 and sets up a connection with the bus bar, so that power is directly supplied to the bus bar.

The multi-channel switch 40 is configured such that the plurality of channels correspondingly connected to the plurality of taps provided in the secondary coil are arranged to face each other, the bus bars are installed at positions spaced apart from the plurality of channels at regular intervals, and the multi-channel switch 40 transfers the power, supplied through the transfer switch or any channel, to the load side.

Furthermore, a shaft composed of square screw pitches is installed in the space between the channels and the bus bars, and a driver having a driving motor equipped with an encoder is formed on one side of the shaft to rotate the shaft in response to a control signal from the control means 50.

Furthermore, a switch head is movably installed on the shaft, the switch head is moved as the shaft is rotated according to the driving of the driver, and any channel to which each tap of the toroidal core 20 is connected and a bus bar are connected to each other so that the power corrected by a step-down or step-up operation can be supplied to the bus bar side through the selected channel.

Furthermore, the multi-channel switch 40 is designed as a prefabricated structure so that it can be configured through addition or subtraction according to the number of voltage taps. Power information related to various input and output voltages, such as the state of the channel to which each tap of the toroidal core 20 is connected correspondingly and/or whether the bypass mode of the change switch is operated, is output onto an LED display unit formed on one side of the lid of the case 10 by the control means 50.

The control means 50 compares the voltage value, input to the main circuit breaker 11, with the average input voltage value, calculates a transformation voltage value based on the comparison of the voltage value, provides a control signal for adjustment for a voltage corresponding to the calculated value to the multi-channel switch 40, and outputs power information related to the input/output voltage to the outside through the LED display.

Furthermore, the control means 50 includes: an input unit configured to input operating conditions of the device involved in voltage regulation; a detection unit configured to measure the voltage and current adjusted through the conditions input from the input unit and detect abnormal current such as undercurrent, overcurrent, or overvoltage of the measured voltage/current; a calculation unit configured to calculate a control value so that bypass or voltage regulation can be performed according to the value measured by the detection unit; a storage unit configured to store values input or measured by the input unit, the detection unit, and the calculation unit; a transmission unit and a reception unit configured to perform bidirectional communication in a wired/wireless manner to transmit the power information input from the electronic watt-hour meter, the operating conditions of the input unit, and various values stored in the storage unit to the LED monitor so that a user can check them, and to receive predetermined input signals from a user; and a control unit configured to control the overall device so that a constant voltage can be supplied to the load side by controlling the multi-channel switch 40 through the value calculated in the calculation unit according to the operation conditions input to the input unit.

In other words, the control means 50 measures the voltage supplied from KEPCO, calculates an average voltage value by summing up measured values, and sets a transformation voltage value.

In addition, the multi-channel switch 40 is controlled through a control signal to select a tap corresponding to the step-down or step-up operation of the toroidal core 20 according to the set voltage transformation value.

The multi-channel switch 40 drives the driver in response to a control signal. The shaft is rotated. According to the rotation of the shaft, the switch head is moved to one channel designated among the plurality of channels in response to a control signal of the control means 50. The voltage is stepped down or up to a magnitude corresponding to that of the set reference voltage by the toroidal core 20, so that stable rated power is supplied to the load side.

The present invention is intended to provide the power saving device capable of reducing power consumption by maintaining a constant output voltage even when an input voltage changes, and more particularly, the power saving device capable of improving the performance and lifespan of a load by stably adjusting a supplied voltage through the toroidal core, the multi-channel switch, and the control means for controlling the same and then supplying it to the load side and also reducing power consumption accordingly, and particularly, safely and firmly fixing the toroidal core in which the primary coil and the secondary coil are wound inside the power saving device by using the core fixing members and also preventing a temperature rise by easily discharging the heat generated in the toroidal core out of the device.

The invention claimed is:

1. A power saving device comprising:

a case (10) having a predetermined volume configured such that a space is formed therein and a main circuit breaker (11) to which external supply power is applied is provided on one side thereof;

a toroidal core (20) provided inside the case (10), and configured such that a primary coil connected to the main circuit breaker (11) is wound, a secondary coil configured to form a voltage having a magnitude corresponding to that of a set reference voltage by selectively stepping up and down a voltage induced in the primary coil via a plurality of taps is wound, and the primary coil and the secondary coil are wound in opposite directions;

core fixing members (30) including a fixing element (31) formed on a bottom surface of the case (10) and provided with a fastening screw (31*a*) protruding upward and a fastening plate (32) formed to have a larger radius than an inner diameter of the toroidal core (20) and configured to be fastened with the fastening screw (31*a*), and configured such that as the toroidal core (20) is seated on the bottom surface of the case (10), the fixing element (31) is inserted into an inner diameter of the toroidal core (20), and the fastening plate (32) is engaged with the fastening screw (31*a*), presses a top portion of the toroidal core (20), and fixes the toroidal core (20) into the inside of the case (10);

a multi-channel switch (40) provided with a plurality of channels correspondingly connected to the taps of the secondary coil, configured such that in response to a control signal, one channel selected from among the plurality of channels is connected to a bus bar and outputs an adjusted voltage to a load side, and also provided with a mode change switch configured to selectively adopt any one of a bypass mode and a voltage regulation mode; and a control means (50) configured to compare a voltage value, input to the main circuit breaker (11), with an average input voltage value, to calculate a transformation voltage value based on the comparison between the voltage values, to provide a control signal for adjusting an input voltage to a voltage corresponding to the calculated value to the multi-channel switch (40), and to output power information related to the input/output voltage to an outside, wherein the core fixing members (30) include a seating part (33) provided on the bottom surface of the case (10) with a predetermined height circumferential outside the fixing element (31) and to allow the toroidal core (20) to be spaced apart from the bottom surface of the case (10), and wherein the seating part (33) includes:

at least one first seating portion (33*a*) formed in a ring shape circumferential outside the fixing element (31), a space is provided between the ring shape of the at least one first seating portion (33*a*) and the fixing element (31);

at least two second seating portions (33*b*) formed radially from the fixing element (31), and extending to a predetermined length in a direction crossing the first seating portion (33*a*); and through holes (33*c*) formed in the bottom surface of the case (10) inside or outside the first seating portion (33*a*) or between the second seating portions (33*b*).

2. The power saving device of claim 1, wherein the fastening plate (32) includes:

a support portion (32*a*) formed in a disk shape having a larger radius than an inner diameter of the toroidal core (20), adapted such that a plurality of recesses (32*b*) are formed spaced apart at regular intervals on an outer periphery thereof, and configured to press the toroidal core (20); and a nut portion (32*c*) formed underneath the support portion (32*a*), and configured to be fastened with the fastening screw (31*a*) of the fixing element (31).

3. The power saving device of claim 1, wherein a ring-shaped insulating member (34) is provided between the toroidal core (20) and the support portion (32*a*) of the fastening plate (32).

4. The power saving device of claim 2, wherein a ring-shaped insulating member (34) is provided between the toroidal core (20) and the support portion (32*a*) of the fastening plate (32).

* * * * *